United States Patent [19]
Sumser et al.

[11] Patent Number: 5,839,281
[45] Date of Patent: Nov. 24, 1998

[54] MOTOR BRAKING ARRANGEMENT

[75] Inventors: Siegfried Sumser, Stuttgart; Erwin Schmidt, Baltmannsweiler, both of Germany

[73] Assignee: Mercedes-Benz AG, Stuttgart, Germany

[21] Appl. No.: 736,030

[22] Filed: Oct. 23, 1996

[30] Foreign Application Priority Data

Oct. 27, 1995 [DE] Germany .......... 195 40 060.7

[51] Int. Cl.⁶ .................................................. F02B 37/12
[52] U.S. Cl. .................................................. 60/602
[58] Field of Search .............. 60/600, 601, 602, 60/603

[56] References Cited

U.S. PATENT DOCUMENTS

| 3,591,959 | 7/1971 | Kubeia et al. . |
| 4,526,004 | 7/1985 | French et al. . |
| 5,394,901 | 3/1995 | Thompson et al. . |

FOREIGN PATENT DOCUMENTS

| 0 215 201 | 3/1987 | European Pat. Off. . |
| 28 20 941 | 11/1978 | Germany . |
| 28 24 598 | 12/1978 | Germany . |
| 30 31 059 | 3/1982 | Germany . |
| 36 10 131 | 9/1987 | Germany . |
| 42 00 612 | 7/1993 | Germany . |
| 04 246 237 | 9/1992 | Japan . |
| 06 278 595 | 10/1994 | Japan . |
| 924760 | 5/1963 | United Kingdom .......... 60/602 |

*Primary Examiner*—Michael Koczo
*Attorney, Agent, or Firm*—Klaus J. Bach

[57] ABSTRACT

In a motor braking arrangement for an internal combustion engine including a turbocharger having a charger connected to the engine by an air intake duct and a turbine connected to the engine by an exhaust gas pipe including an exhaust gas shut-off valve arranged upstream of the turbine, a by-pass line extends from the exhaust gas pipe upstream of the shut-off valve to a gas admission passage of the turbine adjacent the turbine wheel to drive the turbine wheel by the gases discharged from the exhaust gas pipe when the shut-off valve is closed for engine braking purposes.

12 Claims, 2 Drawing Sheets

MOTOR BRAKING ARRANGEMENT

BACKGROUND OF THE INVENTION

The invention relates to a motor braking arrangement for an internal combustion engine with an exhaust gas turbocharger, an exhaust gas conduit and an exhaust gas shut-off valve arranged in the exhaust gas conduit.

DE 28 24 598 C2 discloses a motorbrake for an internal combustion engine provided with an exhaust gas turbocharger which includes a shut-off valve in the exhaust gas conduit between the engine and the turbine. The shut-off valve is a rotary valve with a pivotable valve body having a pivot axis normal to the axis of the exhaust conduit. The shut-off valve has an open position in which the flow of the exhaust gases to the turbine of the turbocharger is uninhibited. It also has a closed position in which a limited exhaust gas flow is permitted to pass through the shut-off valve to the turbine of the turbocharger for driving the turbine wheel.

U.S. 3,591,959 further discloses a motorbrake arrangement for an internal combustion engine wherein, between an engine and an exhaust gas turbocharger, there is provided an exhaust gas shut-off valve by which a front and a rear exhaust gas discharge pipe of a six cylinder engine can be blocked.

However, these motorbrake arrangement which both have shut-off valves arranged ahead of the turbocharger have the disadvantage that during braking operation when the shut-off valve is closed the turbine power output is reduced essentially to zero. Consequently, also the turbocharger speed is greatly reduced such that engine charging is essentially omitted during the braking operation. As a result, the braking energy that can be transmitted to the air mass flow is greatly limited because the air mass flow is greatly reduced. In addition, high braking power results in a high discharge temperature for the engine air generating a high temperature load for the engine. Furthermore, with high braking power requirements, such arrangements have a high exhaust manifold pressure whereby the problem of valve floating may be generated: the exhaust gas manifold pressure may exceed the force of the exhaust valve springs which results in a deterioration of the motor brake effectiveness.

It is the object of the present invention to provide a motor brake arrangement for an internal combustion engine with an exhaust gas turbocharger wherein the braking performance is improved with only small increases in temperature loading of the engine and the exhaust conduit.

SUMMARY OF THE INVENTION

In a motor braking arrangement for an internal combustion engine including a turbocharger having a charger connected to the engine by an air intake duct and a turbine connected to the engine by an exhaust gas pipe including an exhaust gas shut-off valve arranged upstream of the turbine, a by-pass line extends from the exhaust gas pipe upstream of the shut-off valve to a gas admission passage of the turbine adjacent the turbine wheel to drive the turbine wheel by the gases discharged from the exhaust gas pipe when the shut-off valve is closed for engine braking purposes.

A by-pass line branching off the exhaust gas pipe ahead of the shut-off valve and joining the turbine near the turbine wheel has the advantage that the exhaust gas mass supplied to the turbine reaches the turbine wheel at a high flow speed, whereby the turbocharger speed is maintained at a relatively high level, when compared to the state of the art arrangements when the shut-off valve is closed. As a result the air flow mass supplied to the engine at the intake side is substantially above ambient pressure whereby air is forced into the cylinders and the air mass flow through the engine can be substantially increased. When compared to the exhaust gas shut-off arrangements of the state of the art a braking performance can be achieved which is at least as good as that achieved with the prior art arrangements but with lower temperature loading of the engine in the exhaust gas conduit. Tests have actually shown that even the braking power achieved with the arrangement according to the invention is substantially increased by the increased amount of compressed air supplied to the engine during braking operation.

In an advantageous embodiment of the invention, the exhaust gas is supplied to the turbine from the by-pass conduit by way of a flow channel with a nozzle opening disposed just ahead of the turbine wheel. The nozzle openings are preferably in the form of Laval nozzles by which the exhaust flow speed can be increased beyond the speed of sound just ahead of the turbine wheel. The mass flow determining cross-section for the exhaust gas flow in the by-pass line is the smallest cross-section of the nozzle opening. If the shut-off valve is opened the exhaust gas mass flow follows the substantially greater spiral passage of the turbine through the radial inlet nozzle area. During braking operation however the shut-off valve is closed such that only the by-pass line is available to the compressed exhaust gas flow wherein the compressed exhaust gas is accelerated and its swirl is increased resulting in a relatively high turbine rotor speed. This increases the air mass flow at the engine inlet side which is supplied to the engine resulting in increased braking power and reduced operating temperature.

In a further advantageous embodiment of the invention more than one nozzle openings are provided, the nozzles being evenly distributed around the circumference of the turbine for a uniform admission of compressed exhaust gas to the turbine wheel. In this manner, the forces applied to the turbine wheel and the rotor are uniform resulting in a relatively small bearing load for the bearings supporting the shaft extending between the impeller and the turbine wheel.

In a further advantageous embodiment of the invention the nozzle openings are arranged essentially tangentially with respect to the turbine wheel in order to provide a swirl type exhaust gas admission flow to the turbine. This increases turbine power output and provides for a greater air mass flow to the engine.

In another advantageous embodiment of the invention a heat shield arranged behind the turbine wheel is designed so as to receive and support the exhaust gas flow nozzles. In this way, an effective admission of the exhaust gas mass flow to the turbine is achieved with simple and inexpensive design components. Then the by-pass line is preferably connected to a collecting chamber disposed behind the turbine wheel backside wherein the exhaust gas mass flow is uniformly distributed to all the nozzle opening through which the exhaust gas is then admitted to the turbine wheel.

In still another advantageous embodiment of the invention the exhaust gas shut-off valve and the branch-off of the by-pass line are formed integrally with the turbine housing. This reduces the number of building components and facilitates assembly since assembly of the exhaust gas shut-off valves and the mounting of a branch-off line on the exhaust gas conduit are eliminated.

Further advantageous embodiments of the invention will become apparent from the following description on the basis of the accompanying drawings.

DESCRIPTION OF PREFERRED EMBODIMENTS

Figure 1:
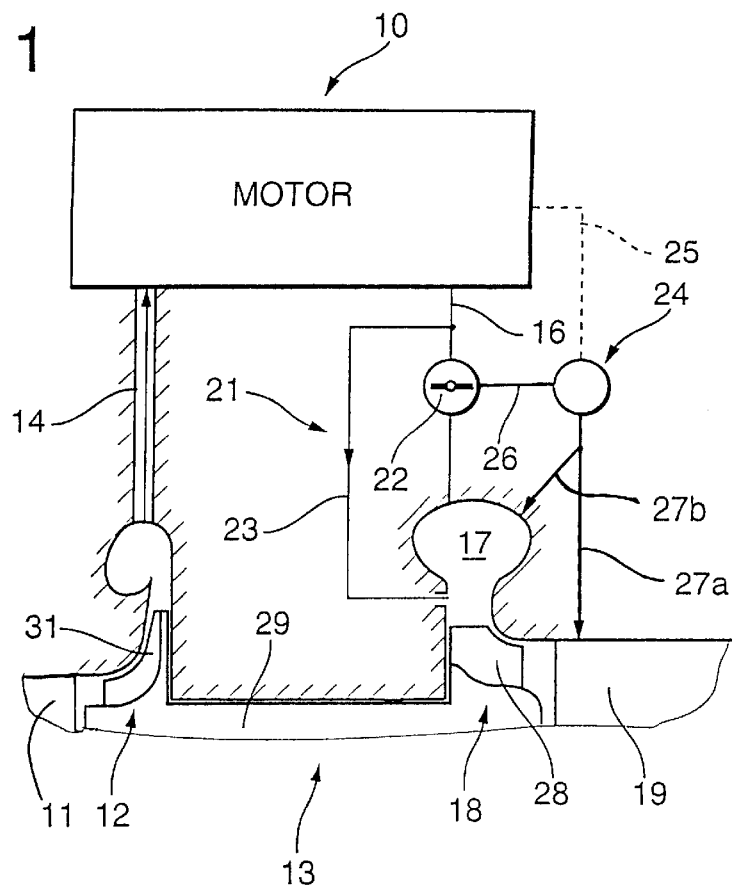
FIG. 1 is a schematic representation of a motor braking arrangement according to the invention.

FIG. 1 shows a multicylinder engine 10 including a first air intake conduit 11 for supplying air to a charger 12 of a turbocharger 13. The air is compressed in the charger 12 and is supplied, by way of a second air intake conduit 14 of the charger, to the combustion chambers of the engine 10. The engine 10 has an exhaust gas discharge side with a first exhaust gas pipe 16 which leads to a flow channel 17 of a turbine 18 of the turbocharger 13. By way of a second exhaust gas pipe 19 downstream of the turbine 18 the exhaust gas generated in the engine is discharged through an exhaust gas cleaning arrangement (not shown).

At the discharge side of the engine, there is an engine brake arrangement 21 which includes a gas flow shut-off valve 22 and a by-pass line 23 branching off the exhaust gas pipe 16 upstream of the shut-off valve 22. Parallel to the shut-off valve 22, there is a pressure relieve arrangement 24 which is coupled with a first connecting line 26 leading to the shut-off valve 22. The pressure relieve arrangement is controlled by an engine electronic control system via a signal transmission line 25. Depending on the desired engine braking power the pressure relief valve 24 which permits accurately dosing the exhaust gas flow being discharged can be opened or closed. The pressure relief valve is also used for overload protection: if the pressure behind the exhaust valves exceeds a predetermined value the pressure relief valve is opened. The conduit 27a downstream of the relief valve 24 leads to the exhaust pipe 19. However, it would also be possible alternatively to provide a line 27b leading to the turbine spiral swirl housing channel 17.

The exhaust gas shut-off valve 22 is a brake flap preferably in the form of a butterfly valve. The shut-off valve flow cross-section corresponds to the cross-sectional area of the exhaust pipe 16, so that during engine driven operation, the exhaust gas pipe 16 can be fully blocked. As a result, an exhaust gas pressure is generated in front of the shut-off valve when the shut-off valve is closed during braking operation. The blocked exhaust gas masses then flow through the by-pass line 23 which joins the turbine housing channel 17 near the turbine wheel 28. As a result, the turbine speed can be at a high level whereby the impeller which is operatively connected to the turbine wheel by means of shaft 29, compresses the intake air which is then conducted to the engine 10. The arrangement provides for an increased air mass flow whereby the temperature of the air downstream of the engine remains relatively low.

The pressure relief valve 24 which is in communication with the shut-off valve 22 comprises a dosing and excess pressure relief arrangement. In this way, the maximum back pressure ahead of the shut-off valve 22 can be limited. A pressure limitation has the advantage that excessive pressures can be prevented. In addition, such excess pressure control valve provides a design wherein the engine charge air pressure can be increased at low engine speeds. With an intelligent control of the pressure relieve arrangement, the braking characteristics of the engine can be advantageously influenced. As soon as the back pressure at the shut-off valve 22 becomes excessive the pressure relieve valve 24 opens so that the excess pressure can be released by way of the first and second connecting lines 26 and 27a or line 27b to the exhaust pipe 19 or the turbine swirl channel 17.

Figure 2:
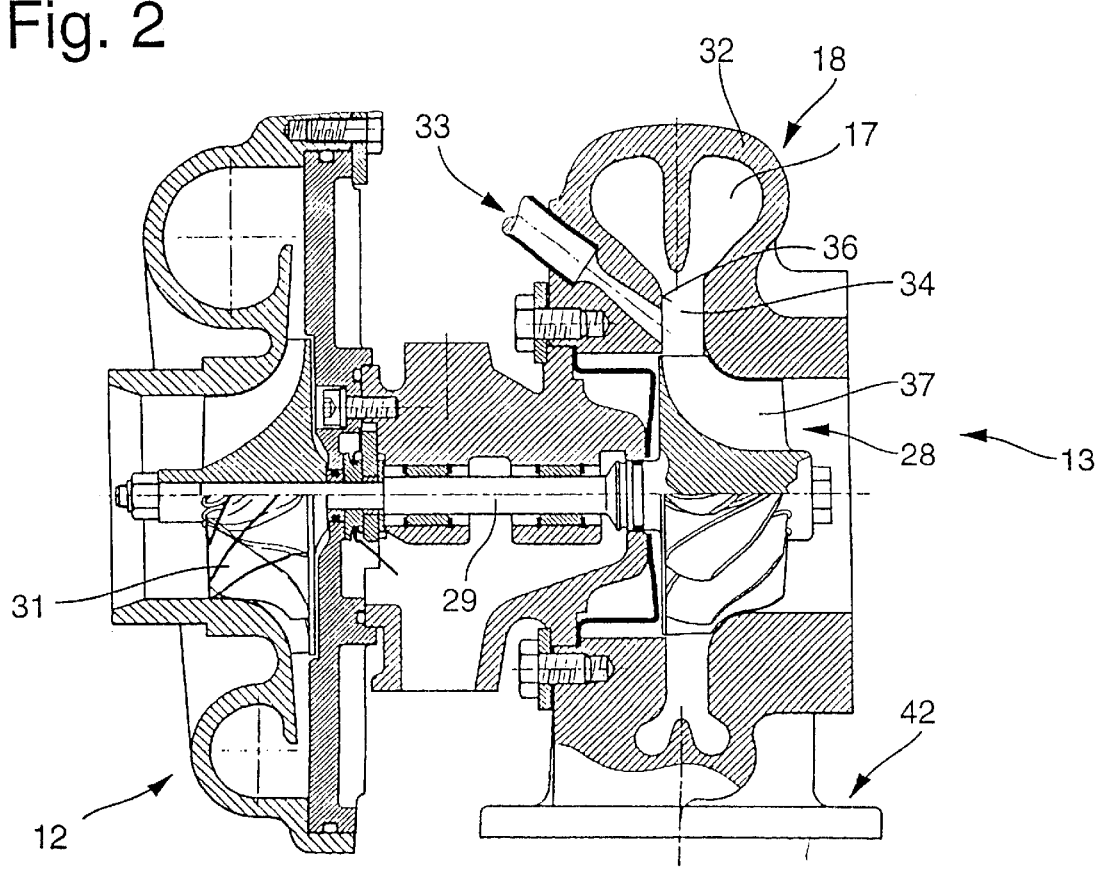
FIG. 2 is a schematic cross-sectional view of an exhaust gas turbocharger with nozzle passages disposed in the turbocharger housing.

FIG. 2 shows the turbocharger 13 schematically in cross-section. The by-pass line 23 leads, by way of nozzle passages 33 formed in a housing 32 of the turbine 18, to the radial guide vane channel 34 downstream of the flow channel 17. The nozzle passage 33 is in the form of a Laval nozzle wherein the exhaust gas masses are accelerated when entering the radial guide vane channel 34. For space reasons the nozzle passage 33 is shown in FIG. 2 at a relatively large angle with respect to the entrance area surface 36, but the angle is actually a relatively small acute angle so that the exhaust gas enters the guide vane channel 34 in a way which provides for an effective energy transfer to the turbine wheel via the vanes 37 of the turbine wheel 28. The nozzle passages are preferably evenly distributed over the circumference of the turbine housing 32.

The by-pass line 23 includes a distribution chamber via which the compressed exhaust gas is supplied to all the nozzle passages arranged in the housing 32 (not shown in FIG. 2). Alternatively, the housing 32 may include, instead of the nozzle passages 33, an exhaust gas flow guide vane arrangement through which the exhaust gas is admitted to the turbine wheel. In any case, with the arrangement of the nozzle passages 33 which may be disposed for example at an angle of 10° with respect to the entrance area surface 36, the exhaust gas is admitted in a swirl type fashion. In this way, a relatively high turbine performance or high turbine speed can be achieved which, again, provides for a relatively high air supply flow to the engine 10.

In effect, a nozzle passages 33 represent the brake gap which corresponds to the brake valve minimum opening of the state-of-the-art engine braking arrangements providing for a minimum flow path to limit engine air discharge pressures to acceptable values. The sum of the nozzle passage cross-sections is about as large as the minimum brake valve flow cross-section of the valve 22 when used in connection with prior art arrangements.

Figure 3:
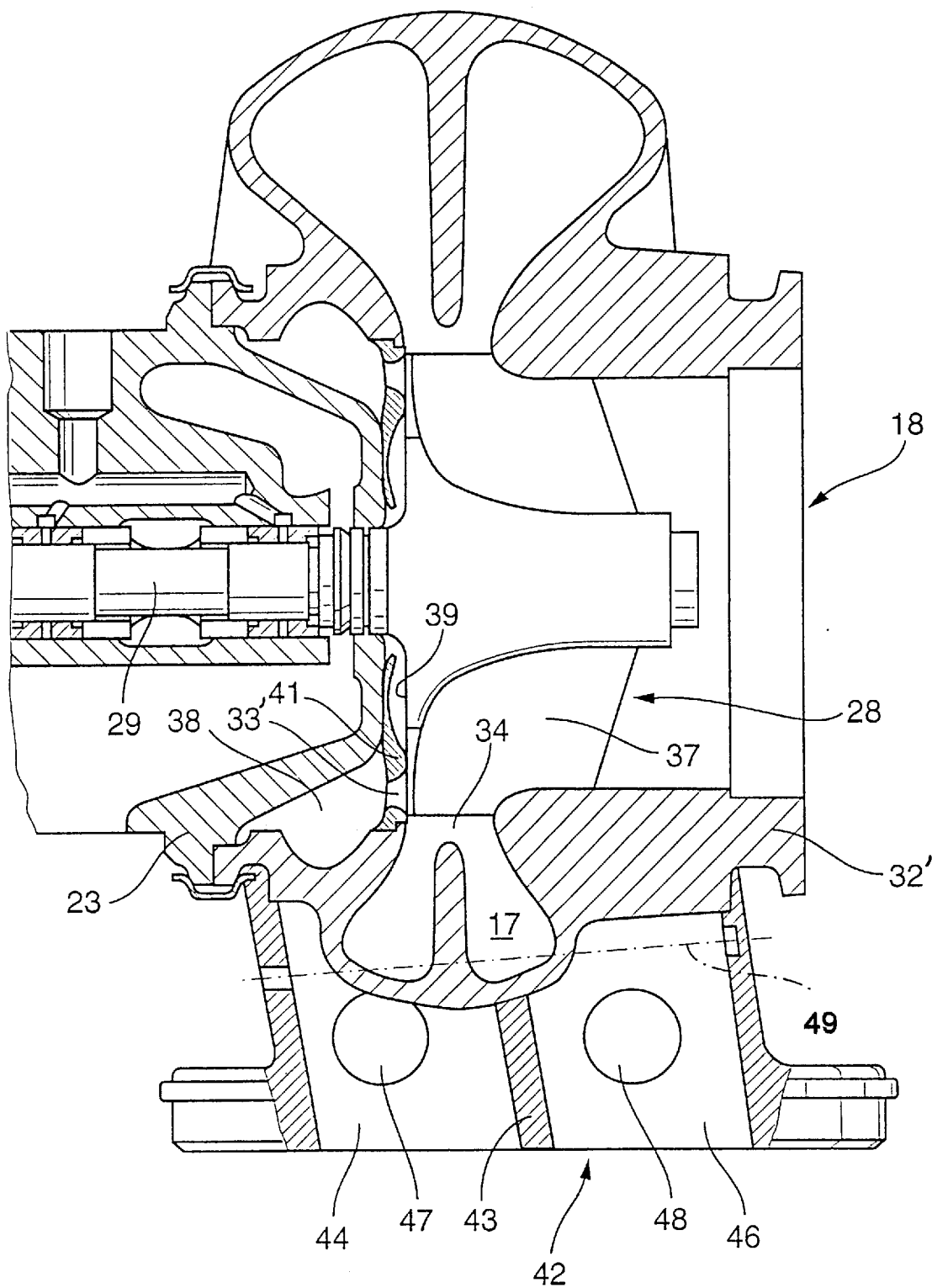
FIG. 3 shows an alternative arrangement with nozzle passages extending from a collecting chamber.

FIG. 3 represents an alternative embodiment wherein the by-pass line 23 leads to a collecting chamber 38 which extends around the turbine shaft adjacent to and behind the wheel backwall 39 of the turbine wheel 28. The collecting chamber 38 is provided with a nozzle insert 41 which includes nozzle passages 33' evenly distributed over the circumference thereof. They are also arranged essentially tangentially with respect to wheel vanes 37 of the turbine wheel 28 so that a twirling flow is provided for the incomming exhaust gas mass flow.

The nozzle insert 41 is disposed within the heat shield as it is shown schematically in FIG. 1. In this manner, the arrangement of the nozzle insert 41 is simple and inexpensive and the exhaust gas can be supplied to the nozzle passages from the adjacent collecting chamber 38 to which the exhaust gas is conducted through the by-pass line 23.

The turbine housing 32' shown in FIG. 3 is for a six cylinder internal combustion engine. The housing 32' includes a connecting portion 42 with a separating wall 43 whereby the exhaust gas flow from a front exhaust manifold 44 and that from a rear exhaust manifold 46 are separately supplied to the flow channel 17. The separating wall 43 improves the pulse charging of the engine.

The connecting portion 42 further includes a shut-off valve in the form of a twin butterfly valve 49 for blocking the front and rear exhaust manifold passages 44, 46. Upstream of the butterfly valve 49, there are provided by-pass openings 47, 48 through which the compressed exhaust gas can be conducted to the collecting chamber 38.

Such an integrated arrangement has the advantage that the shut-off valves as well as the upstream by-pass openings 47, 48 for the by-pass line 23 are all arranged within the turbine housing 32' so that the arrangement is compact and requires little space in the engine compartment.

An integrated arrangement for the shut-off valve and the by-pass lines 23 connected to the collecting chamber may also be provided for the arrangement shown in FIG. 2. This arrangement may also include a simple connecting portion 42 extending from the housing 32 of the turbine 18 as it is shown for the embodiment of FIG. 3 and there may also be provided a nozzle insert for admitting compressed exhaust gas from a nozzle chamber to the turbine.

What is claimed is:

1. A motor braking arrangement for an internal combustion engine including a turbocharger having a turbine with a turbine wheel with a back wall disposed in a turbine housing and connected to the engine by an exhaust gas pipe and a charger connected to the engine by an air intake conduit, an exhaust gas shut-off valve arranged in the exhaust gas pipe upstream of said turbine and a by-pass line extending from said exhaust gas pipe upstream of said shut-off valve and leading to a gas admission passage of said turbine adjacent said turbine wheel, said gas admission passage leading to an area of said turbine housing adjacent said turbine wheel back wall, and at least one nozzle extending from said area of said turbine housing adjacent the turbine back wall to said turbine wheel for directing said gas onto said turbine wheel.

2. A motor braking arrangement according to claim 1, wherein said gas admission passage is provided in the form of at least one nozzle passage arranged in the turbine housing so as to admit exhaust gas flowing through said by-pass line to a turbine flow channel adjacent said turbine wheel.

3. A motor braking arrangement according to claim 1, wherein the combined flow cross-section of said at least one nozzle is sufficiently large to limit back pressure in said exhaust gas pipe to an admissible value.

4. A motor braking arrangement according to claim 1, wherein said gas admission passage includes at least one nozzle passage arranged at an acute angle with respect to an entrance area surface of the turbine housing.

5. A motor braking arrangement according to claim 4, wherein said turbine housing includes an insert in which said at least one nozzle passage is formed.

6. A motor braking arrangement according to claim 1, wherein said shut-off valve and said by-pass line are disposed in said turbine housing.

7. A motor braking arrangement according to claim 1, wherein said shut-off valve is in communication, by way of a first connecting line, with a pressure relieve arrangement which is in communication, by way of second connecting lines, with one of an exhaust gas duct and said turbine housing.

8. A motor braking arrangement according to claim 7, wherein said pressure relief arrangement includes an excess pressure relief valve which is adjustable to open when a certain maximum back-up pressure is reached in the exhaust gas pipe at the shut-off valve.

9. A motor braking arrangement according to claim 7, wherein said excess pressure relieve valve is controlled by a control signal supplied to the excess pressure relieve valve by a control line.

10. A motor braking arrangement according to claim 9, wherein said control signal is provided by an electronic engine control device of said engine.

11. A motor braking arrangement according to claim 9, wherein, with the shut-off valve fully closed, said excess pressure relief valve is controllable for changing the braking characteristics of said engine.

12. A motor braking arrangement according to claim 1, wherein said shut-off valve is a valve that can be fully closed so as to essentially fully block the exhaust gas pipe.

\* \* \* \* \*